US009564996B2

(12) United States Patent
Terry et al.

(10) Patent No.: US 9,564,996 B2
(45) Date of Patent: *Feb. 7, 2017

(54) METHOD AND SYSTEM FOR SUPPORTING MULTIPLE HYBRID AUTOMATIC REPEAT REQUEST PROCESSES PER TRANSMISSION TIME INTERVAL

(71) Applicant: INTERDIGITAL TECHNOLOGY CORPORATION, Wilmington, DE (US)

(72) Inventors: Stephen E. Terry, Northport, NY (US); Robert L. Olesen, Huntington, NY (US); Jin Wang, Princeton, NJ (US); Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,227

(22) Filed: Feb. 8, 2016

(65) Prior Publication Data

US 2016/0156436 A1    Jun. 2, 2016

Related U.S. Application Data

(63) Continuation of application No. 14/467,880, filed on Aug. 25, 2014, now Pat. No. 9,258,096, which is a
(Continued)

(51) Int. Cl.
*H04L 1/18* (2006.01)
*G08C 25/02* (2006.01)
(Continued)

(52) U.S. Cl.
CPC ........... *H04L 1/1861* (2013.01); *H04B 7/0413* (2013.01); *H04B 7/0632* (2013.01);
(Continued)

(58) Field of Classification Search
CPC .... H04L 1/1607; H04L 5/0055; H04L 1/1887; H04L 1/1812; H04W 72/042
See application file for complete search history.

(56) References Cited

U.S. PATENT DOCUMENTS 6,021,124 A    2/2000  Haartsen
6,421,803 B1   7/2002  Persson et al.
(Continued)

FOREIGN PATENT DOCUMENTS

CN    1464677    12/2003
CN    1731771    2/2006
(Continued)

OTHER PUBLICATIONS

NN8804166: "Software-Based Error Control for Personal Systems Communications Links", M Technical Disclosure Bulletin, Apr. 1988, vol. No. 30 Issue No. 11 p. No. 166-171; US.*
(Continued)

*Primary Examiner* — Guy Lamarre
(74) *Attorney, Agent, or Firm* — Volpe and Koenig, P.C.

(57) ABSTRACT

A method and apparatus may be used for supporting multiple hybrid automatic repeat request (H-ARQ) processes per transmission time interval (TTI). A transmitter and a receiver may include a plurality of H-ARQ processes. Each H-ARQ process may transmit and receive one TB per TTI. The transmitter may generate a plurality of TBs and assign each TB to a H-ARQ process. The transmitter may send control information for each TB, which may include H-ARQ information associated TBs with the TBs. The transmitter may send the TBs using the associated H-ARQ processes simultaneously per TTI. After receiving the TBs, the receiver may send feedback for each of the H-ARQ processes and associated TBs indicating successful or unsuccessful receipt of each of the TBs to the transmitter. The feedback for multiple
(Continued)

TBs may be combined for the simultaneously transmitted H-ARQ processes, (i.e., TBs).

24 Claims, 2 Drawing Sheets

Related U.S. Application Data continuation of application No. 14/082,986, filed on Nov. 18, 2013, now Pat. No. 8,819,514, which is a continuation of application No. 13/735,515, filed on Jan. 7, 2013, now Pat. No. 8,589,753, which is a continuation of application No. 13/309,713, filed on Dec. 2, 2011, now Pat. No. 8,352,824, which is a continuation of application No. 11/670,202, filed on Feb. 1, 2007, now Pat. No. 8,074,137.

(60) Provisional application No. 60/839,462, filed on Aug. 23, 2006, provisional application No. 60/765,076, filed on Feb. 3, 2006.

(51) Int. Cl.
   *H04L 1/16* (2006.01)
   *H04W 72/04* (2009.01)
   *H04L 5/00* (2006.01)
   *H04B 7/04* (2006.01)
   *H04B 7/06* (2006.01)

(52) U.S. Cl.
   CPC .......... *H04L 1/1607* (2013.01); *H04L 1/1812* (2013.01); *H04L 1/1887* (2013.01); *H04L 5/0053* (2013.01); *H04L 5/0055* (2013.01); *H04W 72/042* (2013.01); *H04W 72/0406* (2013.01); *H04W 72/0446* (2013.01)

(56) References Cited

U.S. PATENT DOCUMENTS

| | | | |
|---|---|---|---|
| 6,658,005 B2 | 12/2003 | Seidel et al. | |
| 6,977,888 B1 | 12/2005 | Frenger et al. | |
| 7,075,917 B2 | 7/2006 | Herrmann | |
| 7,263,088 B2 | 8/2007 | Bui | |
| 7,287,206 B2 | 10/2007 | Terry et al. | |
| 7,379,746 B2 | 5/2008 | Lee et al. | |
| 7,392,460 B2 | 6/2008 | Kim et al. | |
| 7,447,968 B2 | 11/2008 | Ha et al. | |
| 7,508,804 B2 | 3/2009 | Das et al. | |
| 7,590,181 B2 | 9/2009 | Awad et al. | |
| 7,640,486 B2 | 12/2009 | Dottling et al. | |
| 7,924,785 B2 | 4/2011 | Shaheen et al. | |
| 8,270,345 B2 | 9/2012 | Franceschini et al. | |
| 2002/0159431 A1 | 10/2002 | Moulsley et al. | |
| 2003/0074476 A1 | 4/2003 | Kim et al. | |
| 2003/0086391 A1 | 5/2003 | Terry et al. | |
| 2003/0147371 A1 | 8/2003 | Choi et al. | |
| 2003/0152062 A1 | 8/2003 | Terry et al. | |
| 2003/0153276 A1 | 8/2003 | Terry et al. | |
| 2004/0009786 A1 | 1/2004 | Terry | |
| 2004/0037224 A1 | 2/2004 | Choi et al. | |
| 2004/0152458 A1 | 8/2004 | Hottinen | |
| 2004/0185785 A1 | 9/2004 | Mir et al. | |
| 2004/0190523 A1 | 9/2004 | Gessner et al. | |
| 2004/0199846 A1 | 10/2004 | Matsumoto et al. | |
| 2005/0063345 A1 | 3/2005 | Wu et al. | |
| 2005/0063347 A1 | 3/2005 | Sarkkinen et al. | |
| 2005/0105494 A1 | 5/2005 | Kim et al. | |
| 2005/0128993 A1 | 6/2005 | Yu et al. | |
| 2005/0152310 A1* | 7/2005 | Rudolf .............. | H04W 72/1278 370/329 |
| 2005/0180449 A1 | 8/2005 | Ranta-Aho et al. | |
| 2005/0219999 A1 | 10/2005 | Kim et al. | |
| 2005/0250540 A1 | 11/2005 | Ishii et al. | |
| 2005/0276266 A1 | 12/2005 | Terry | |
| 2006/0013161 A1 | 1/2006 | Suzuki | |
| 2006/0034240 A1 | 2/2006 | Kwak et al. | |
| 2006/0092972 A1 | 5/2006 | Petrovic et al. | |
| 2006/0128309 A1 | 6/2006 | Dateki et al. | |
| 2006/0209813 A1 | 9/2006 | Higuchi et al. | |
| 2007/0049308 A1 | 3/2007 | Lindoff et al. | |
| 2007/0133449 A1 | 6/2007 | Schacht et al. | |
| 2007/0255993 A1 | 11/2007 | Yap et al. | |

FOREIGN PATENT DOCUMENTS

| | | |
|---|---|---|
| EP | 1 389 848 | 2/2004 |
| JP | 09-247132 | 9/1997 |
| WO | 03/036844 | 5/2003 |
| WO | 03/069818 | 8/2003 |
| WO | 03/094554 | 11/2003 |
| WO | 2004/015906 | 2/2004 |
| WO | 2004/102863 | 11/2004 |
| WO | 2005/018241 | 2/2005 |
| WO | 2005/109729 | 11/2005 |
| WO | 2005/112327 | 11/2005 |
| WO | 2005/112331 | 11/2005 |

OTHER PUBLICATIONS

Ancheta et al., "Software-Based Error Control for Personal Systems Communications Links," IBM Technical Disclosure Bulletin, vol. 30, No. 11, pp. 166-171, TDB-ACC-NO: NN8804166 (Apr. 1988).

Aniba et al., "Adaptive Proportional Fairness for Packet Scheduling in HSDPA", Global Telecommunications Conference, 2004, GLOBECOM, vol. 6, pp. 4033-4037, (Nov. 29-Dec. 3, 2004).

Das et al., "Evolution of UTMS Toward High-Speed Downlink Packet Access", Bell Labs Technical Journal, vol. 7, No. 7, pp. 47-68, (Mar. 4, 2003).

Ericsson et al., "Revised Text Proposal on Multiplexing Method of L1/L2 Control Signaling in Uplink Single-Carrier FDMA Radio Access," TSG-RAN WG1 #43, R1-051570, Seoul, Korea (Nov. 7-11, 2005).

Ericsson et al., "Revised Text Proposal on Multiplexing Method of L1/L2 Control Signaling in Uplink Single-Carrier FDMA Radio Access," TSG-RAN WG1 #43, R1-051306, Seoul, Korea (Nov. 7-11, 2005).

Ericsson et al., *Text Proposal on Adaptive Modulation and Channel Coding Rate Control for Frequency Domain Scheduling in Evolved UTRA Downlink*, TSG-RAN WG1 #43, R1-051307, (Seoul, Korea Nov. 7-11, 2005).

Forket et al., *High Speed Downlink Packet Access (HSDPA)—Enhanced Data Rates for UMTS Evolution*, Computer Networks, Elsevier Science Publisher B.V., vol. 49, No. 3, pp. 325-340, (Oct. 19, 2005).

Huawei, "Further considerations on multiplexing method of shared Control Channel in Uplink Single-Carrier FDMA," TSG-RAN WG1 #43, R1-051430, Seoul, Korea (Nov. 7-11, 2005).

IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Std. 802.16e-2005 (Feb. 2006).

Lucent Technologies, "L2/L3 MIMO Aspects," TSG-RAN Working Group 2 Meeting #43, R2-041550 (Aug. 16-20, 2004).

Lucent Technologies, "Signalling Support for Multiple Simultaneous Transmissions to a UE within a TTI," TSG-RAN WG1 and WG2 Adhoc on HSDPA, 12A010055 (Nov. 5-7, 2001).

Lundevall et al., "Streaming Applications Over HSDPA in Mixed Service Scenarios", 2004 IEEE 60$^{th}$ Vehicular Technology Conference, 2004, VTC2004-Fall., vol. 2, pp. 841-845, (Sep. 26-29, 2004).

Nortel Networks, "Discussion on ARQ aspects for High Speed Downlink Packet Access," TSG-RAN Working Group1 meeting #17, TSGR1#17(00)1442 (Nov. 21-24, 2000).

Phillips, "HS-SCCH signalling for Rel-7 FDD MIMO scheme," 3GPP TSG RAN WG1 Meeting #46, R1-061953, Tallinn, Estonia (Aug. 28-Sep. 1, 2006.

(56) References Cited

OTHER PUBLICATIONS

Samsung, "Data and Control Multiplexing in DFT-S-OFDM," 3GPP TSG RAN WG1 Meeting #42bis, R1-051039, San Diego, USA (Oct. 10-14, 2005).
Samsung, "Downlink Pilot and Control Channel Structure for EUTRA," 3GPP TSG RAN WG1 Meeting #43, R1-051344, Seoul, Korea (Nov. 7-11, 2005).
Siemens, "Signaling methods for Hybrid ARQ Type II/III," 3GPP TSG RAN WG1 #12, R1-00-0514 (Apr. 10-13, 2000).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.4.0 (Jan. 2007).
Third Generation Partnership Project, "Technical Specification Group Radio Access Network; Physical Channels and Modulation (Release 8)," 3GPP TS 36.211 V0.2.2 (Dec. 2006).
Third Generation Partnership Project, "Technical Specification Group Radio Access Network; Physical layer procedures (Release 8)," 3GPP TS 36.213 V0.2.0 (Oct. 2006).
Third Generation Partnership Project, "Technical Specification Group Radio Access Network; Multiplexing and channel coding (Release 8)," 3GPP TS 36.212 V0.2.1 (Nov. 2006).
Third Generation Partnership Project, "Technical Specification Group Radio Access Network; Multiplexing and channel coding (FDD) (Release 7)," 3GPP TS 25.212 V7.3.0 (Dec. 2006).
Third Generation Partnership Project, "Technical Specification Group Radio Access Network; Multiplexing and channel coding (FDD) (Release 6)," 3GPP TS 25.212 V6.10.0 (Dec. 2006).
Third Generation Partnership Project, "Technical Specification Group Radio Access Network; Multiplexing and channel coding (FDD) (Release 6)," 3GPP TS 25.212 V6.7.0 (Dec. 2005).
Third Generation Partnership Project, "Technical Specification Group Radio Access Network; Multiplexing and channel coding (FDD) (Release 5)," 3GPP TS 25.212 V5.10.0 (Jun. 2005).
Third Generation Partnership Project, "Technical Specification Group Radio Access Network; High Speed Downlink Packet Access (HSDPA); Overall description; Stage 2 (Release 7)," 3GPP TS 25.308 V7.1.0 (Dec. 2006).
Third Generation Partnership Project, "Technical Specification Group Radio Access Network; High Speed Downlink Packet Access (HSDPA); Overall description; Stage 2 (Release 6)," 3GPP TS 25.308 V6.3.0 (Dec. 2004).
Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).
Third Generation Partnership Project, "Technical Specification Group Radio Access Network; Physical layer procedures (FDD) (Release 7)," 3GPP TS 25.214 V7.3.0 (Dec. 2006).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Physical layer procedures (FDD) (Release 6)," 3GPP TS 25.214 V6.7.1 (Dec. 2005).
Third Generation Partnership Project, "Technical Specification Group Radio Access Network; Physical layer procedures (FDD) (Release 5)," 3GPP TS 25.214 V5.11.0 (Jun. 2005).
Third Generation Partnership Project, "Technical Specification Group Radio Access Network; Medium Access Control (MAC) protocol specification (Release 7)," 3GPP TS 25.321 V7.3.0 (Dec. 2006).
Third Generation Partnership Project, "Technical Specification Group Radio Access Network; Medium Access Control (MAC) protocol specification (Release 6)," 3GPP TS 25.321 V6.11.0 (Dec. 2006).
Third Generation Partnership Project, "Technical Specification Group Radio Access Network; Medium Access Control (MAC) protocol specification (Release 5)," 3GPP TS 25.321 V5.12.0 (Sep. 2005).
Third Generation Partnership Project, "Technical Specification Group Radio Access Network; Medium Access Control (MAC) protocol specification (Release 6)," 3GPP TS 25.321 V6.7.0 (Dec. 2005).
Third Generation Partnership Project, "Technical Specification Group Radio Access Network; MAC protocol specification (Release 5)," 3GPP TS 25.321 V5.0.0 (Mar. 2002).
Third Generation Partnership Project, "Technical Specification Group Radio Access Network; Physical Layer Aspects for Evolved UTRA (release 7)," 3GPP TR 25.814 V1.0.1 (Nov. 2005).
Third Generation Partnership Project, "Technical Specification Group Radio Access Network; Physical later aspects for evolved Universal Terrestrial Radio Access (UTRA) (Release7)," 3GPP TR 25.814 V7.1.0 (Sep. 2006).
Third Generation Partnership Project, "Technical Specification Group Radio Access Network; Multiplexing and channel coding (FDD) (Release 6)," 3GPP TS 25.212 V6.2.0 (Jun. 2004).
Zheng et al., *Multiple ARQ Processes for MIMO Systems*, EURASIP Journal on Applied Signal Processing, vol. 5, pp. 772-782, XP002347853, (May 2004).

\* cited by examiner

METHOD AND SYSTEM FOR SUPPORTING MULTIPLE HYBRID AUTOMATIC REPEAT REQUEST PROCESSES PER TRANSMISSION TIME INTERVAL

CROSS REFERENCE TO RELATED APPLICATIONS

This application is a continuation of U.S. patent application Ser. No. 14/467,880, filed Aug. 25, 2014, which will issue on Feb. 9, 2016 as U.S. Pat. No. 9,258,096, which is a continuation of U.S. patent application Ser. No. 14/082,986, filed Nov. 18, 2013, which issued on Aug. 26, 2014 as U.S. Pat. No. 8,819,514, which is a continuation of U.S. patent application Ser. No. 13/735,515, filed Jan. 7, 2013, which issued on Nov. 19, 2013 as U.S. Pat. No. 8,589,753, which is a continuation of U.S. patent application Ser. No. 13/309,713, filed Dec. 2, 2011, which issued on Jan. 8, 2013 as U.S. Pat. No. 8,352,824, which is a continuation of U.S. patent application Ser. No. 11/670,202, filed Feb. 1, 2007, which issued on Dec. 6, 2011 as U.S. Pat. No. 8,074,137, which claims the benefit of U.S. Provisional Application Nos. 60/839,462 filed Aug. 23, 2006 and 60/765,076 filed Feb. 3, 2006, the contents of which are hereby incorporated by reference.

FIELD OF INVENTION

The present invention is related to wireless communication systems. More particularly, the present invention is related to a method and system for supporting multiple hybrid automatic repeat request (H-ARQ) processes per transmission time interval (TTI).

BACKGROUND

The third generation partnership project (3GPP) is currently considering a long term evolution (LTE) of the 3GPP to provide a new radio access network for a high-data-rate, low-latency, packet-optimized, improved system with high capacity and better coverage. The LTE is an evolution of the radio interface, (i.e., evolved universal terrestrial radio access (UTRA)), and the radio network architecture, (i.e., evolved universal terrestrial radio access network (UTRAN)). Currently, orthogonal frequency division multiple access (OFDMA) and single carrier frequency division multiple access (SC-FDMA) are proposed as air interface technologies to be used in the downlink and uplink transmissions respectively.

Meanwhile, 3GPP high speed packet access evolution (HSPA+) is also being proposed to improve the 3GPP radio access network capacity and coverage. In HSPA+, an evolution of the radio interface and the radio network architecture is being considered. In HSPA+, the air interface technology will still be based on code division multiple access (CDMA), but with a more efficient physical layer architecture including independent channelization codes, (distinguished with respect to channel quality), and multiple-input multiple-output (MIMO).

H-ARQ has been adopted by several wireless communication standards including 3GPP and 3GPP2. Besides the radio link control (RLC) layer's automatic repeat request (ARQ) function, H-ARQ provides improved throughput and performance with respect to link adaptation errors and rate control. Asynchronous H-ARQ is used in high speed downlink packet access (HSDPA) and synchronous H-ARQ is used in high speed uplink packet access (HSUPA).

The conventional H-ARQ scheme is a single H-ARQ scheme in which a transmitter transmits only one transport block (TB) per TTI via one H-ARQ process. With the introduction of physical resource dependent link adaptation mechanism in LTE or HSPA+, the conventional H-ARQ signaling mechanism, (i.e., signaling mechanism for single H-ARQ), is not sufficient for transmitting multiple TBs per TTI via multiple H-ARQ processes.

Therefore, it would be desirable to provide a method and system for supporting multiple H-ARQ processes for transmitting multiple TBs simultaneously per TTI.

SUMMARY

A method and apparatus may be used for supporting multiple H-ARQ processes per TTI. A transmitter and a receiver may include a plurality of H-ARQ processes. Each H-ARQ process may transmit and receive one TB per TTI. The transmitter may generate a plurality of TBs and assign each TB to a H-ARQ process. The transmitter may send control information for each TB, which may include H-ARQ information associated TBs with the TBs. The transmitter may send the TBs using the associated H-ARQ processes simultaneously per TTI. After receiving the TBs, the receiver may send feedback for each of the H-ARQ processes and associated TBs indicating successful or unsuccessful receipt of each of the TBs to the transmitter. The feedback for multiple TBs may be combined for the simultaneously transmitted H-ARQ processes, (i.e., TBs). The control information and the feedback may be sent via a layer 1 control part or layer 2 or layer 3 signaling. When MIMO is implemented, one H-ARQ process may be associated with one MIMO stream, or codeword. The feedback may include a channel quality indicator (CQI) per MIMO stream or codeword.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The present invention is applicable to any wireless communication system including, but not limited to, LTE and HSPA+ of the 3GPP standard.

Figure 1:
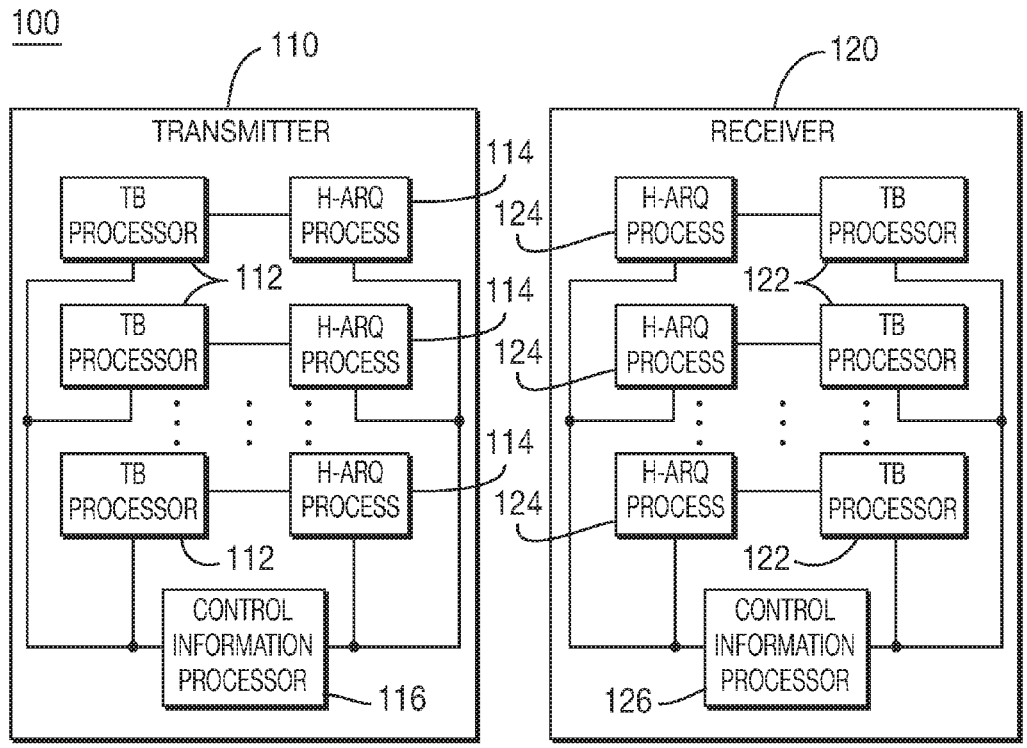
FIG. 1 is a block diagram of a system supporting multiple H-ARQ processes per TTI in accordance with the present invention.

FIG. 1 is a block diagram of a system 100 in accordance with the present invention. The system 100 includes a transmitter 110 and a receiver 120. The transmitter 110 and the receiver 120 may be a wireless transmit/receive unit (WTRU) and a Node-B, or vice versa. The terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. The terminology "base station" includes but is not limited to a Node-B, a site controller, an access point (AP), or any other type of interfacing device capable of operating in a wireless environment.

The transmitter 110 includes a plurality of TB processors 112, a plurality of H-ARQ processes 114 and a control information processor 116. Each TB processor 112 receives at least one data flow, (for example, at least one flow of medium access control (MAC) or RLC packet data units (PDUs)), and generates at least one TB. Multiple MAC or RLC PDUs may be multiplexed into one TB. In accordance with the present invention, multiple TBs may be transmitted simultaneously per TTI using multiple H-ARQ processes. The TB processor 112 selects a proper transport format combination (TFC), (i.e., TB size, TB set size, TTI, modulation and coding scheme (MCS), subcarriers, antenna beams, precoding matrix indication (PMI), cyclic redundancy check (CRC) size, redundancy version (RV), data block to radio resource mapping, or the like), for each of the TBs based on the link condition between the transmitter 110 and the receiver 120. Preferably, a separate CRC is attached to each TB. Multiple TBs are then transmitted simultaneously via multiple H-ARQ processes 114 per TTI.

The transmitter 110 assigns each of the TBs to a particular H-ARQ process and transmits multiple TBs via the assigned H-ARQ processes simultaneously per TTI. For example, when several independent spatial data streams, (i.e., several TBs), are transmitted simultaneously using MIMO, one H-ARQ process may be assigned to each spatial data stream, (i.e., one TB), and the multiple spatial data streams may be transmitted simultaneously via multiple H-ARQ processes.

The control information processor 116 is configured to send control information regarding the TBs and the H-ARQ processes associated with the TBs to the receiver 120 for each TTI. The control information includes, but is not limited to, a transport format and resource indicators (TFRIs) and H-ARQ-related information. The TFRI includes, but is not limited to, information about the dynamic part of the TFC, (including TB set size and modulation and coding scheme) and physical channel information, (i.e., channelization codes, subcarriers and antenna beams onto which the TBs are mapped in the corresponding TTI). The H-ARQ information includes, but is not limited to, an H-ARQ process ID, an H-ARQ function ID and a redundancy version. The control information may include rate matching parameters for each TB. Rate matching parameters for each TB may be derived from the TFRI.

The receiver 120 includes a plurality of TB processors 122, a plurality of H-ARQ processes 124 and a control information processor 126. The control information processor 126 processes control information received from the transmitter 110. Each H-ARQ process 124 processes one TB per TTI so that multiple TBs may be processed simultaneously per TTI based on the control information received from the transmitter 110. The H-ARQ process 124, (or the control information processor 126), sends feedback to the transmitter 110 indicating successful or unsuccessful receipt of each of the TBs, so that the transmitter 110 may retransmit failed TBs based on the feedback. The TB processors 122 process successfully received TBs based on the control information.

The feedback for multiple TBs may be combined for the simultaneous transmission of H-ARQ processes, (i.e., TBs). The control information and the feedback may be sent via a layer 1 control part or layer 2 or layer 3 signaling. When MIMO is implemented, the feedback may include a CQI per MIMO stream, or codeword.

Figure 2:
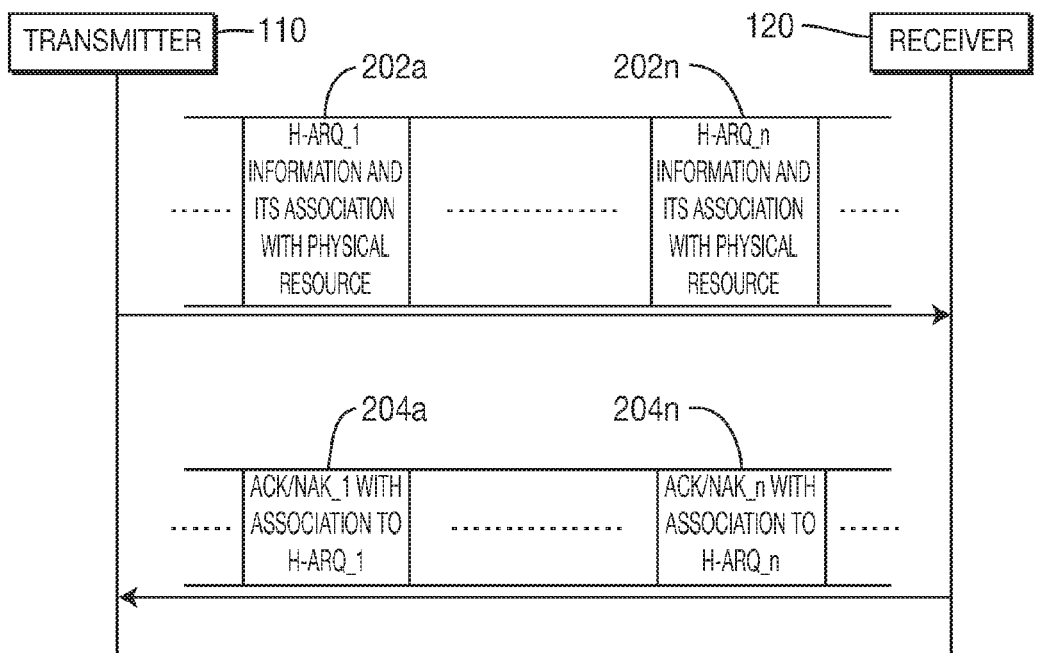
FIG. 2 shows transmission of associated control information for supporting simultaneous multiple H-ARQ processes and transmission of multiple TBs per TTI in accordance with the present invention.

FIG. 2 shows transmission of associated control information for supporting simultaneous multiple H-ARQ processes and transmission of multiple TBs per TTI in accordance with the present invention. The transmitter 110 sends a set of control information 202a-202n for the set of TBs transmitted in a common TTI to the receiver 120. The control information 202a-202n for the simultaneous H-ARQ transmissions may be concatenated into a single packet.

The control information 202a-202n includes information associating each control information 202a-202n with a corresponding TB. In a conventional wireless communication system, (i.e., HSDPA and HSUPA), control information for only one TB is transmitted through a separate control channel per TTI, (i.e., a high speed shared control channel (HS-SCCH) in HSDPA and an enhanced dedicated physical control channel (E-DPCCH) in HSUPA), and since only one TB is transmitted per TTI, there is an implicit association between the transmitted TB and the related control information. However, in accordance with the present invention, since multiple TBs are transmitted simultaneously in one TTI through multiple H-ARQ processes, the control information 202a-202n should include association information relating each control information 202a-202n to its associated TB. With the association information, the receiver 220 unambiguously knows which control information 202a-202n is for which TB so that the receiver 220 can use the right control information 202a-202n for processing of each TB.

Figure 3:
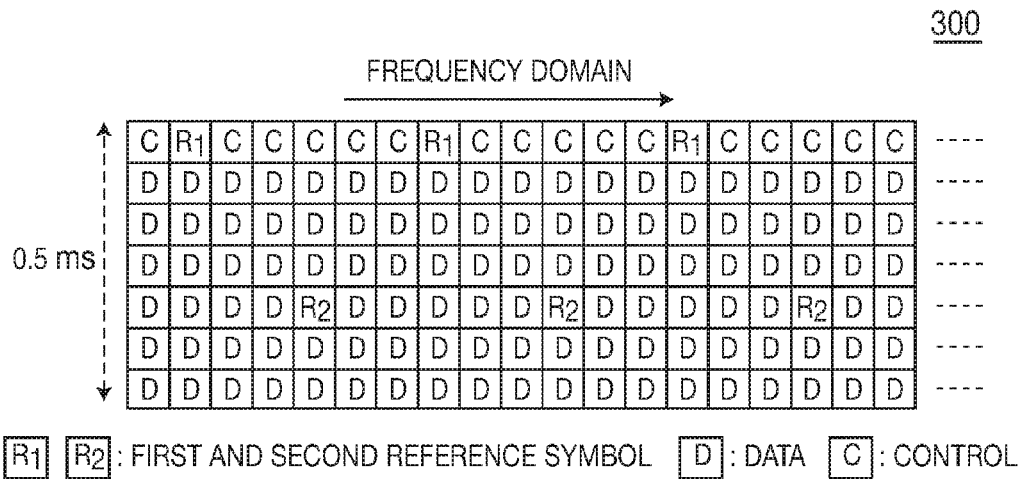
FIG. 3 shows an LTE downlink physical layer frame structure of data and associated control information.

The control information may be transmitted via a layer 1 control part of one TTI or layer 2 or layer 3 signaling. FIG. 3 shows an LTE downlink physical layer subframe 300 for data and associated control information. The subframe 300 includes a data part, (denoted as "D"), and a control part, (denoted as "C"). The control information may be included in the control part of the subframe 300. The downlink layer 1 frame structure for HSPA+ will be based on CDMA technology which may include independent channelization-codes (distinguished with regard to channel quality) and MIMO. With variable TTI, the control part may contain control information for data block mapped onto several subframes. When MIMO is used, the control information may also contain the allocation of spatial streams or codewords of different data blocks mapped to different H-ARQ functions per TTI.

Upon reception of the TBs, the receiver 120 sends separate feedback, (i.e., a positive acknowledgement (ACK) or a negative acknowledgement (NACK)), for each of the TBs. FIG. 2 also shows transmission of feedback 204a-204n for supporting multiple H-ARQ processes per TTI in accordance with the present invention. Since multiple feedback transmission 204a-204n is done for different H-ARQ processes from the receiver 120 to the transmitter 110, the transmitter 110 will know which feedback is for which H-ARQ process, (i.e., TB). For this association, an H-ARQ process ID, (or any other association information), may be included in each feedback 204a-204n to indicate the corresponding H-ARQ process.

Alternatively, if a pre-defined pattern or sequence of TBs associated with H-ARQ processes can be maintained and guaranteed by the transmitter 110 and the receiver 120, the feedback 204a-204n may be sent according to the pre-defined pattern or sequence so that the transmitter 110 knows which feedback corresponds to which H-ARQ process. For example, the feedback may be arranged in either ascending or descending order with respect to H-ARQ IDs associated with the feedback. This may be determined during the call setup. Alternatively, if a TB is successfully received by the receiver 120, the position for that TB's feedback may be filled with a dummy packet with a known pattern so that the transmitter 110 may recognize the successful receipt of the TB when the transmitter 110 decodes the feedback packet.

The feedback 204a-204n may be concatenated into a single packet for multiple H-ARQ processes, (i.e., multiple TBs). The number of feedback, (i.e., the number of ACKs and NACKs), concatenated into a single feedback packet is dependent on the number of H-ARQ processes used for transmission of the TBs. When the number of feedback increases, a more robust MCS, subcarriers, antenna beams, codewords, or higher transmission power may be used for transmission of the concatenated feedback packet. Due to the importance of this feedback packet, a CRC may be attached to the concatenated feedback packet to improve the error detection at the transmitter 110.

Figure 4:
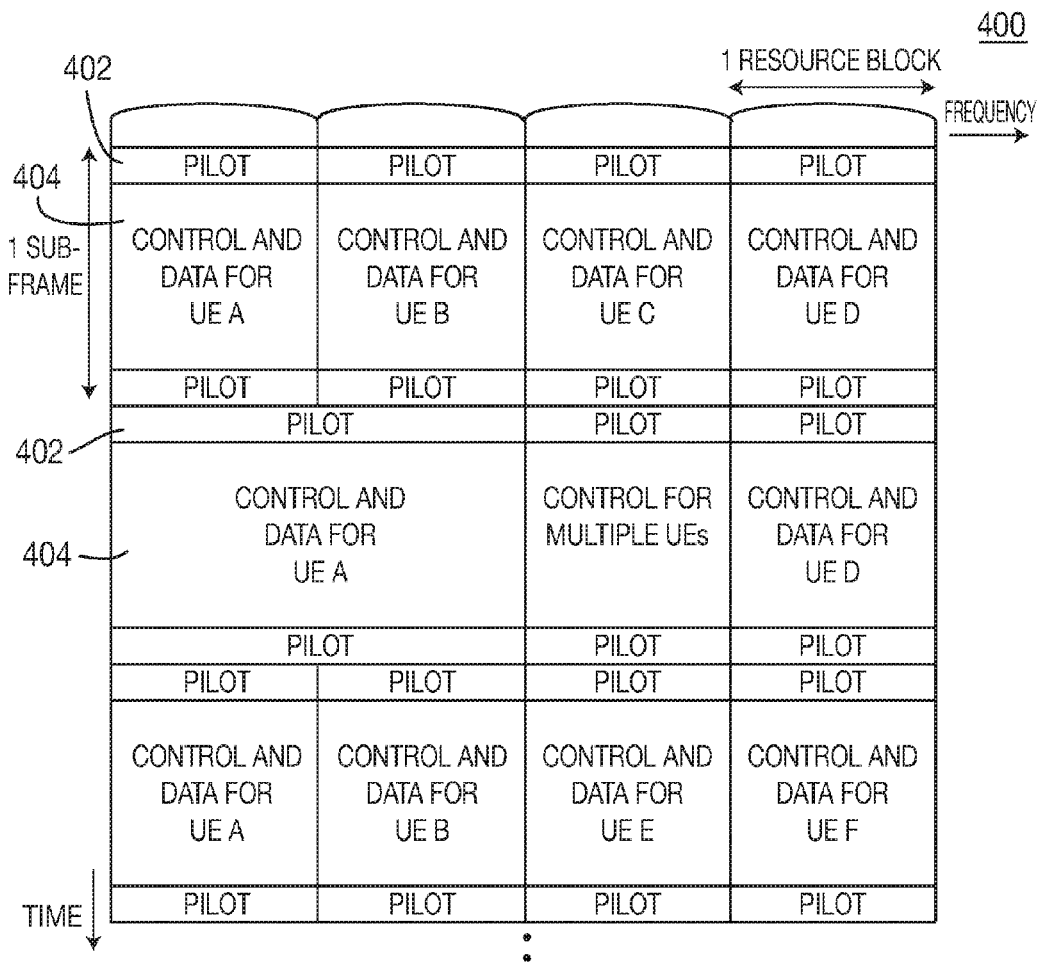
FIG. 4 shows an LTE uplink physical layer frame structure for data and associated control information.

The feedback may be included in the control part of the physical layer frame. FIG. 4 shows an LTE uplink physical layer subframe 400 structure. The subframe 400 includes a pilot part 402 and a control and data part 404. The feedback may be included in the control and data part 404 of the subframe 400.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) for receiving multiple transport blocks (TB)s, the WTRU comprising:
   a receiver configured to, in one transmission time interval (TTI), receive control information for each of a plurality of TBs, and to utilize the control information to receive the plurality of TBs;
   a processor configured to process the plurality of TBs, to generate a feedback message that includes a channel quality indicator (CQI) and indicates successful or unsuccessful receipt of each of the plurality of TBs, to determine whether to include a cyclic redundancy check (CRC) with the feedback message, and based on the amount of feedback, to select a coding scheme for the feedback message; and
   a transmitter configured to transmit the generated feedback message.

2. The WTRU of claim 1, wherein the receiver is further configured to receive a separate cyclic redundancy check (CRC) for each of the plurality of TBs.

3. The WTRU of claim 1, wherein the feedback message includes a channel quality indicator (CQI) for each of a plurality of multiple-input multiple-output (MIMO) streams.

4. The WTRU of claim 1, wherein the control information includes, for each TB of the plurality of TBs, a modulation and coding scheme (MCS) and Hybrid automatic repeat request (HARQ) information, wherein the HARQ information for each TB includes a redundancy version.

5. The WTRU of claim 1, wherein the control information includes an allocation for each TB of the plurality of TBs to a different spatial stream.

6. The WTRU of claim 1, wherein feedback for each TB of the plurality of TBs is concatenated in feedback message.

7. The WTRU of claim 1, wherein a more robust coding scheme is selected as the number of feedback increases.

8. The WTRU of claim 1, wherein the amount of feedback is based on the number of ACK/NACKs in the feedback message.

9. A Node-B configured to transmit multiple transport blocks (TB)s, the Node-B comprising:
   a transmitter and processor configured to, in one transmission time interval (TTI), transmit control information for each of a plurality of TBs, and to utilize the control information to transmit the plurality of TBs; and
   a receiver and processor configured to receive and decode a feedback message that includes a channel quality indicator (CQI) and indicates successful or unsuccessful receipt of each of the plurality of TBs at a wireless transmit/receive unit (WTRU), wherein the feedback message is received and decoded based on a modulation and coding scheme that is associated with the amount of feedback.

10. The Node-B of claim 9, wherein the transmitter and processor is further configured to transmit a separate cyclic redundancy check (CRC) for each of the plurality of TBs.

11. The Node-B of claim 9, wherein the feedback message includes a channel quality indicator (CQI) for each of a plurality of multiple-input multiple-output (MIMO) streams.

12. The Node-B of claim 9, wherein the control information includes, for each TB of the plurality of TBs, a modulation and coding scheme (MCS) and Hybrid automatic repeat request (HARQ) information, wherein the HARQ information for each TB includes a redundancy version.

13. The Node-B of claim 9, wherein the control information includes an allocation for each TB of the plurality of TBs to a different spatial stream.

14. The Node-B of claim 9, wherein feedback for each TB of the plurality of TBs is concatenated in feedback message.

15. The Node-B of claim 9, wherein a more robust modulation and coding scheme is selected at the WTRU as the number of feedback increases.

16. The Node-B of claim 9, wherein the amount of feedback is based on the number of ACK/NACKs in the feedback message.

17. A method performed by wireless transmit/receive unit (WTRU) for receiving multiple transport blocks (TB)s, the method comprising:
   receiving a control information for each of a plurality of TBs in a transmission time interval (TTI);
   utilizing the control information to receive the plurality of TBs the TTI;
   generating a feedback message that includes a channel quality indicator (CQI) and indicates successful or unsuccessful receipt of each of the plurality of TBs;
   determining whether to include a cyclic redundancy check (CRC) with the feedback message;
   based on the amount of feedback, selecting a coding scheme for the feedback message; and
   transmitting the feedback message using the selected coding scheme.

18. The method of claim 17, further comprising: receiving a separate cyclic redundancy check (CRC) for each of the plurality of TBs.

19. The method of claim 17, wherein the feedback message includes a channel quality indicator (CQI) for each of a plurality of multiple-input multiple-output (MIMO) streams.

20. The method of claim 17, wherein the control information includes, for each TB of the plurality of TBs, a modulation and coding scheme (MCS) and Hybrid automatic repeat request (HARQ) information, wherein the HARQ information for each TB includes a redundancy version.

21. The method of claim 17, wherein the control information includes an allocation for each TB of the plurality of TBs, to a different spatial stream.

22. The method of claim 17, wherein feedback for each TB of the plurality of TBs is concatenated in feedback message.

23. The method of claim 17, wherein a more robust coding scheme is selected as the number of feedback increases.

24. The method of claim 17, wherein the amount of feedback is based on the number of ACK/NACKs in the feedback message.

* * * * *